United States Patent [19]

de Jaeger

[11] 4,433,425
[45] Feb. 21, 1984

[54] METHOD AND APPARATUS FOR DETECTING THE TRAINING SEQUENCE FOR A SELF-ADAPTING EQUALIZER

[75] Inventor: Bogéna de Jaeger, Paris, France

[73] Assignee: Societe Anonyme dite: Compagnie Industrielle des Telecommunications Cit-Alcatel, Paris, France

[21] Appl. No.: 329,096

[22] Filed: Dec. 9, 1981

[30] Foreign Application Priority Data

Dec. 12, 1980 [FR] France ................................ 80 26455

[51] Int. Cl.³ .............................................. H04L 7/10
[52] U.S. Cl. ..................................... 375/113; 375/13; 370/107
[58] Field of Search .................. 375/11, 13, 14, 113, 375/114, 115, 116; 370/107, 106; 328/63, 72; 333/18

[56] References Cited

U.S. PATENT DOCUMENTS

| | | | |
|---|---|---|---|
| 3,591,720 | 7/1971 | Othmer | 370/106 |
| 3,823,377 | 7/1974 | Keane et al. | 375/115 |
| 4,006,352 | 2/1977 | Sato | 375/13 |
| 4,320,517 | 3/1980 | Godard et al. | 375/13 |
| 4,361,890 | 11/1982 | Green, Jr. et al. | 370/106 |

FOREIGN PATENT DOCUMENTS

| | | | |
|---|---|---|---|
| 13343 | 12/1979 | European Pat. Off. | 375/77 |
| 2352456 | 5/1977 | France | 375/75 |

*Primary Examiner*—Jin F. Ng
*Assistant Examiner*—Stephen Chin
*Attorney, Agent, or Firm*—Sughrue, Mion, Zinn, Macpeak & Seas

[57] ABSTRACT

The method relates to the detection of the training sequence of a self-adapting equalizer at the receiver end of a synchronous data-transmission system, the training sequence being preceded a synchronizing transmission of data transformed on coding into a succession of multivalent symbols such that the transmitted signal has a frequency spectrum which is substantially a single large-amplitude spectrum line. The training sequence begins with the transmission of data transformed on coding and at least one null symbol. The method consists in detecting the presence of the large-amplitude spectrum line in the signal formed by the received but not yet equalized symbols by means of a digital filter 40 and in thereafter detecting the first following major drop in absolute amplitude of the signal that lasts throughout the duration of one symbol period. This is done by means of a low amplitude level detector 50. The invention applies to the detection of the training sequence for an equalizer in a system operating according to CCITT recommendation V 37.

8 Claims, 3 Drawing Figures

METHOD AND APPARATUS FOR DETECTING THE TRAINING SEQUENCE FOR A SELF-ADAPTING EQUALIZER

The present invention relates to a synchronous data-transmission system of the type in which a receiver portion includes an equalizer which corrects the distorsions caused to the transmitted signal by the transmission channel.

BACKGROUND OF THE INVENTION

Each time a call is set up such an equaliser requires presetting to match it to the transmission channel actually used, and the presetting is provided by transmitting a training signal sequence. The present invention relates more particularly to a synchronous data transmission system of the above-mentioned type which, at least when setting up a link, uses a code that transforms successive groups of n consecutive bits into corresponding successive multivalent symbols, where n is an integer not less than unity, and where the code transforms groups of n consecutive first logic state bits into a null symbol, and a sequence of groups of n consecutive second logic state bits into a sequence of symbols that give rise to a transmitted frequency spectrum which is substantially constituted by a single large-amplitude spectrum line, and which uses an initializing procedure comprising a synchronizing sequence followed by a training sequence, the synchronizing sequence at least ending with a period during which a sequence of groups of n consecutive second logic state bits are transmitted to provide a signal substantially in the form of a single large-amplitude spectrum line, and the training sequence beginning with a least one group of n first logic state bits transmitted in the form of a null symbol.

In particular, use of the present invention makes it possible to detect the beginning of the training sequence for a self-adapting equalizer in a synchronous transmission system which operates in accordance with CCITT recommendation V 37.

Synchronous transmission of data requires, on transmission, the operations of scrambling, coding and possibly modulation and, on reception, the reverse operations: demodulation where necessary, decoding and unscrambling. A filtering operation is also required to correct the distortions generated by the transmission channel.

The coding operation is justified by the works of H. Nyquist who showed that the transmission speed through an ideal low-pass network cannot exceed two data pulses per hertz of pass-band and that it is possible to come close to this theoretical limit by a smoothly rolled-off low-pass filter with a linear phase characteristic. Coding consists in replacing binary data by symbols which may possibly assume more than two values and which are transmitted at a lower rate than the binary data. The symbols are then shaped by filtering to bring the characteristics of the link being used as close as possible to those of a smoothly rolled-off low-pass filter with a linear phase characteristic.

The scrambling operation aims to avoid including large-amplitude spectrum lines in the frequency spectrum of the transmitted signal due to repetitive sequences in the data to be transmitted since such spectrum lines generate intermodulation noise. Scrambling also facilitates some operations at the receiver end such as clock recovery and filter adjustment to correct the distortions due to the transmission channel. Scrambling takes place before coding and consists in dividing the synchronous binary data to be transmitted by the generation polynomial of a pseudo-random binary sequence. Unscrambling then consists in multiplying the decoded synchronous binary data obtained by the same generation polynomial as is used during the scrambling operation. The scrambler is generally made on the basis of a sequential recursive linear filter and the unscrambler is generally made on the basis of a sequential non-recursive linear filter whose structure is complementary and self-synchronizable. For a detailed description of these structures, reference can advantageously be made to the article by J. E. Savage which appeared on pages 449 to 487 of the February 1967 issue of the BSTJ (Bell System Technical Journal).

Since the filtering operation aims to correct distortions due to the transmission channel, it is carried out by means of a filter called an equalizer which is adjusted so as to obtain, in conjunction with the transmission channel and taking into account the signal shaping after coding, an overall behaviour for the link which is almost the same as that of a smoothly rolled-off low-pass filter with a linear phase characteristic. As a general rule, present equalizers are self-adapting, i.e. they adjust themselves automatically so as to minimize the error which affects the symbols received before decoding. The measurement of this error determines how well the equalizer is adapted, and requires accurate estimation of the transmitted symbols. This estimation can be deduced from the signals from the decoder when the error which affects the symbols applied to it is sufficiently small not to perturb it, i.e. when the equalizer is, in actual fact, near to its optimum adjustment. In contrast, when initially adjusting the coefficients of the equalizer, the error can be deduced only on the basis of prior knowledge of the data transmitted. That is why it is general practice to transmit a succession of binary data called a training sequence during initialization, the composition of this data being known at the receiver end. This sequence is a pseudo-random binary sequence generated at the transmitter end by the scrambler whose input is held at a fixed logic level and, at the receiver end, by the unscrambler which is transformed for this purpose by a set of switches into a scrambler and whose input is held at a fixed logic level. The scrambler and the unscrambler which are then used as two identical and independent generators of pseudo-random binary successions lose their self-synchronization properties. However, synchronization is necessary between the training sequence which comes from the scrambler and is transmitted, received via the transmission channel and made available in coded form at the output of the equalizer, and the coded version of the training sequence generated at the receiver end by the unscrambler, since each shift between these two training sequences results in an identical shift in the coefficients of the equalizer. This shift can be compensated for during self-adaption on real data only if it does not exceed a few symbols. This gives rise to the need at the receiver end to be able to detect the beginning of a training sequence coming from the transmitter end.

One known way of proceeding consists in taking advantage of the fact that the training sequence whose frequency spectrum is composed of a plurality of lines of small and uniform amplitude is preceded in most cases by a synchronization sequence consisting in the transmission of a signal whose frequency spectrum is limited to a few lines of large amplitude to allow clock recovery at the receiver end and also possibly to allow modulation carrier recovery. The instant at which the beginning of the training sequence coming from the transmitter is received can then be deduced from the instant at which the frequency spectrum of the received signal changes and passes from a few large-amplitude lines to a plurality of uniform low-amplitude lines. A band-pass filter is then used whose pass-band is such that the energy at the output of the filter is very low during the synchronization sequence and increases greatly from the beginning of the training sequence. The energy at the output of the filter is measured to make it possible to detect the passage from one sequence to the other. The disadvantage of such a method is that measuring the energy requires integration, and hence causes lack of accuracy on detecting the beginning of the training sequence. This poor accuracy can be up to several tens of symbols with present transmission speeds and is incompatible with the capacity of an equalizer of normal dimensions to self adapt on real data.

Preferred embodiments of the present invention avoid this drawback by taking advantage of the particularities of the code and of the initialization process used when a link is set up, in particular for transmission systems which comply with CCITT recommendation V 37.

SUMMARY OF THE INVENTION

The present invention provides a method of detecting a training sequence for initializing a self-adapting equalizer located at the receiver end of a synchronous data transmission system; said system being of a type which, at least when setting up a link, uses a code that transforms successive groups of n consecutive bits into corresponding successive multivalent symbols, where n is an integer not less than unity, and where the code transforms groups of n consecutive first logic state bits into a null symbol, and a sequence of groups of n consecutive second logic state bits into a sequence of symbols that give rise to a transmitted frequency spectrum which is substantially constituted by a single large-amplitude spectrum line, and which uses an initializing procedure comprising a synchronizing sequence followed by a training sequence, the synchronizing sequence at least ending with a period during which a sequence of groups of n consecutive second logic state bits are transmitted to provide a signal substantially in the form of a single large-amptitude spectrum line, and the training sequence beginning with a least one group of n first logic state bits transmitted in the form of a null symbol; wherein the method of detecting the training sequence consists: in monitoring the received but not yet equalized signal at the receiver end; in detecting the presence of the large-amplitude spectrum line therein due to the transmission of a sequence of groups of n second logic state bits; and thereafter in detecting the first following large drop in absolute amplitude that lasts for at least one symbol period and in treating said detected drop in absolute amplitude as constituting said null symbol corresponding to the first group of n first logic state bits at the beginning of the training sequence.

The invention also provides an apparatus for putting the above-mentioned method into effect.

BRIEF DESCRIPTION OF THE DRAWINGS

The invention will become more clearly apparent from the following description of an embodiment given by way of example. This description is given with reference to the accompanying drawings in which.

MORE DETAILED DESCRIPTION

In general, the invention relates to a synchronous data-transmission system of the type which has, at its receiving end, an equalizer requiring presetting by means of a training sequence transmitted during a connection-initializing process and which at least when setting up a link, uses a code that transforms successive groups of n consecutive bits into corresponding successive multivalent symbols, where n is an integer not less than unity, and where the code transforms groups of n consecutive first logic state bits into a null symbol, and a sequence of groups of n consecutive second logic state bits into a sequence of symbols that give rise to a transmitted frequency spectrum which is substantially constituted by a single large-amplitude spectrum line, and which uses an initializing procedure comprising a synchronizing sequence followed by a training sequence, the synchronizing sequence at least ending with a period during which a sequence of groups of n consecutive second logic state bits are transmitted to provide a signal substantially in the form of a single large-amplitude spectrum line, and the training sequence beginning with a least one group of n first logic state bits transmitted in the form of a null symbol.

Without loss of generality, the following is a description of an application of the invention to a synchronous data-transmission system in compliance with CCITT recommendation V 37. Such data-transmission systems constitute a large category of transmission systems that meet the preceding requirements.

Figure 1:
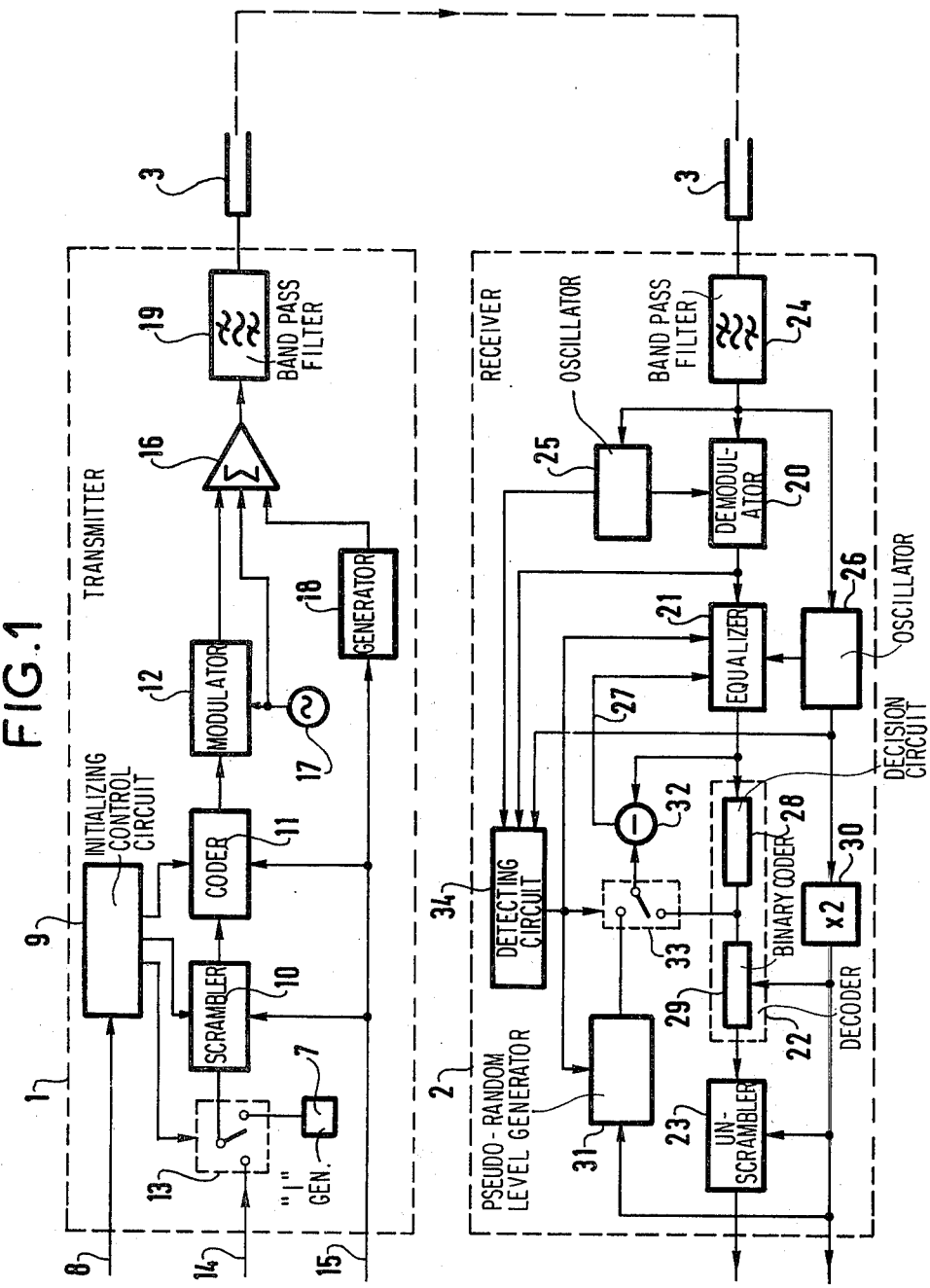
FIG. 1 is the general diagram of a synchronous data-transmission system of the type to which the invention applies.

FIG. 1 shows how the invention fits in to such a data transmission system and illustrates very schematically the main components of one transmission direction.

Synchronous data-transmission systems which comply with CCITT recommendation V 37 are two-way, four-wire transmission systems with a bit rate of about 144 bits/s in each direction, using a seven-level duobinary code and single sideband amplitude modulation, placing the transmission signal in the 64 kHz to 100 kHz bandwidth of a primary group B of telephone transmission channels. Data is transmitted in both directions on two independent channels.

As illustrated in FIG. 1, one transmission direction has a transmitter portion 1 connected to a receiver portion 2 by means of a transmission channel 3.

The main components of the transmitter portion 1 are a scrambler 10 followed by a coder 11 and a modulator 12.

Figure 2:
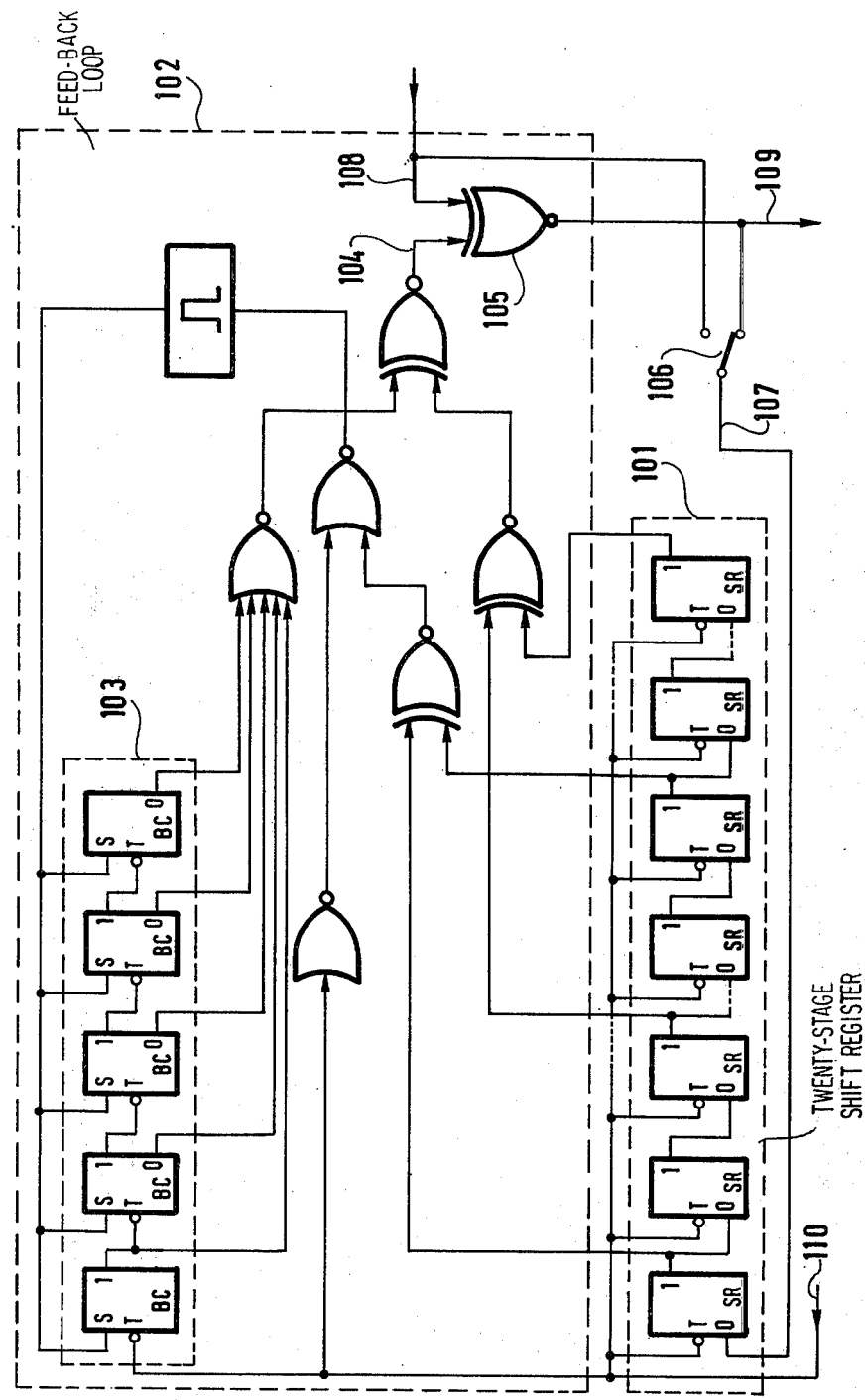
FIG. 2 shows in detail the scrambler and the unscrambler illustrated in FIG. 1 and known per se.

The scrambler 10 receives the synchronous binary data to be transmitted at the rate of 144 kbits/s to the input 14 of the transmitter portion 1 via a controlled switch 13. As stated previously, the scrambler is used to avoid the presence of large-amplitude spectrum lines in the frequency spectrum of the transmitted signal during data transmission. It complies with CCITT recommendation V 37, i.e. it delivers at its output a bit whose logic state is such that it produces odd parity when it is taken in consideration with the input bit to the scrambler together with the output bits from the scrambler at three and at twenty bit periods previously except if the scrambler has previously delivered more than thirty-one consecutive bits of identical logic state, in which case the output bit of the scrambler is complemented. The scrambler 10 can have the structure proposed in the appendix of CCITT recommendation V 37 which structure is illustrated for reference in FIG. 2. Here, it comprises a twenty-stage shift register 101 which is clocked by the sequence of synchronous binary data to be transmitted. This data appears at an input 15 of the transmitter portion 1. The shift register 101 is equipped with a feed-back loop 102 which includes logic gates and a five-stage binary counter 103. The data input is input 108 of an "EXCLUSIVE NOR" logic gate 105, the data output is output 109 from the same logic gate 105 and the clock input on which the bit rate appears is conductor 110 which leads to the clock inputs of the stages of the shift register 101 and of the counter 103.

The scrambler 10 can be used as a pseudo-random binary sequence generator in which case its input is connected via the controlled change-over switch 13 to the output of a circuit 7 which delivers a constant logic state 1.

The scrambler 10 further includes logic circuits which are useful during the initializing processes and which serve: to open the feed back loop by applying a logic 1 state to input 104 of its "EXCLUSIVE NOR" logic gate 105; to reset all the stages of the shift register 101 to zero, and to set all the stages of the binary counter 103 to one. Opening the feed back loop of the scrambler makes it transparent to the binary data applied to it. This property is used at the beginning of an initializing process while the scrambler receives a constant logic 1 state generated by the circuit 7. The shift register stages are reset to zero and the binary counter stages are set to one before putting the scrambler 10 into operation as a pseudo-random sequence generator so as to start said sequence from a precise state. It will be observed that said sequence always begins with a sequence of 31 bits in the logic 0 state since on starting, the bits contained in the third and twentieth stages of the shift register 101 are in the logic 0 state, while the bit applied to the input of the scrambler is in the logic 1 state, giving rise to a bit in the logic 0 state at the output of the scrambler 10. This situation would become permanent if the counter did not advance by one step at each bit period and did not come into action to change the logic state of the thirty-second bit.

The coder 11 illustrated following the scrambler 10 in FIG. 1 transforms the synchronous binary data delivered at the rate of 144 kbits/s by the scrambler 10 into a sequence of symbols which follow one another at a baud rate R of 72 kbits/s with a spectrum limited to the 0 to 36 kHz frequency band. It uses the duobinary seven-level ode in compliance with CCITT recommendation V37. This type of code uses linear superposition of responses of the form $$\frac{\sin(\omega_1 t)}{\omega_1 t}$$

where $\omega_1$ the angular frequency of half the baud rate, i.e. $\omega_1 = \pi R = 2\pi R/2$. Different amplitude combinations are superposed. This signal shaping, effected entirely during coding in compliance with CCITT recommendation V 37, makes it possible, with respect to the connection, to very nearly obtain the characteristics of a smoothly rolled off low-pass filter with a linear phase characteristic providing that the transmission channel has a flat amplitude response and a linear phase response in its useful band. The seven-level duobinary code in compliance with CCITT recommendation V 37, as well as the circuits for obtaining it, are well-known in the art. For details on this subject, reference can be made to the book by R. W. Lucky, J. Salz and E. J. Weldon, entitled: "Principles of Data Communication", published by McGraw Hill in 1968. To understand the part of the description which follows herein, it is sufficient to bear in mind that the coding provides a symbol which corresponds to two pairs of two successive bits, said symbol having one of seven levels: 0, ±1, ±2, ±3. A pair of logic 0 bits is transformed into a zero amplitude symbol, and a sequence of logic 1 bits is transformed into a sequence of pairs of symbols of the same amplitude 2 which are alternatively positive and negative, giving rise to a frequency spectrum which is reduced substantially to a single high-amplitude spectrum line at frequency of one quarter of the symbol rate, i.e. at 18 kHz.

The coder is also equipped with means for controlling resetting to zero which are used in initializing processes.

The modulator 12 which follows the coder 11 receives the symbols from said coder together with a 100-kHz carrier generated by an oscillator 17. It modulates the lower side band of the carrier, thereby shifting the symbols from the 0–36 kHz frequenzy band to the 64–100 kHz frequency band of a primary group B of telephone transmission channels.

The output of the modulator 12 is applied to a summing unit 16. This summing unit is used for adding a carrier pilot wave whose frequency is 100 kHz and a clock pilot wave whose frequency is 64 kHz and which is related to the symbol rate R by the equation 100 − R/2, said carrier being delivered by an oscillator 17. Said clock pilot wave is generated by a generator 18 from the rate at which the binary data is applied to the input 15 of the transmitter portion 1. The output of the summing unit 16 is connected to a band-pass filter 19 which limits the spectrum of the transmitted signal to the frequency band transmitted by the transmission channel 3.

The transmitter portion 1 further includes an initializing control circuit 9 which controls: the changeover switch 13; the opening of the scrambler feed back loop; the resetting to zero of the stages of the shift register; and the setting to one of the stages of its counter together with the resetting to zero of the coder. When a request is applied to the input 8 of the transmitter portion, the initializing control circuit triggers an initializing process in compliance with CCITT recommendation V 37. After such a request, and during 10,240 baud periods, it opens the scrambler feed-back loop, it resets the stages of the shift register to zero and it sets the counter stages to one, while connecting the input of the scrambler 10 to the output of the circuit 7 which delivers a constant logic state 1. The result of this is that at the beginning of an initializing process, a transmission signal is transmitted which comprises only the carrier and clock pilot waves at 100 kHz and 64 kHz. After the 10,240 baud periods, the initializing control circuit stops resetting of the coder 11 to zero for 4,096 baud periods. Since the scrambler 10 is transparent to the data which it receives (constant logic 1 state coming from the circuit 7), the coder receives synchronous binary data of constant logic 1 state and, as previously mentioned, delivers a sequence of pairs of symbols of constant amplitude 2 but which are alternately positive and negative and whose frequency spectrum is substantially a single line at 18 kHz transposed to 82 kHz by the modulator 12. This 82 kHz line is added to the carrier and clock pilot waves. These first two steps of the initialization process constitute a synchronization sequence for the receiver portion 2. At the end of the initial 14,336 baud periods the initialization control circuit closes the feedback loop of the scrambler 10 and ceases resetting the shift register stages to zero and setting the counter stages to one. The scrambler 10 then generates a pseudo-random binary sequence which begins with a succession of zeros. This sequence is coded in the coder 11, is then modulated by the modulator 12 and is subsequently used in the receiving part as a training sequence for the self-adapting equalizer which corrects the distorsions due to the telephone transmission channel. Lastly, after a maximum of 276,480 baud periods the initialization control circuit changes over the controlled changeover switch 13 and connects the input of the scrambler to the input 14 of the transmitter portion 1 by which the synchronous binary data to be transmitted is applied.

The main components of the receiver portion 2 are a demodulator 20, an equalizer 21, a decoder 22 and an unscrambler 23.

The demodulator 20 receives the symbols in the 64 kHz–100 kHz frequency band coming from the telephone transmission channel via an automatic gain-control circuit, not illustrated, and a band-pass filter 24 which blocks noise outside the band. The demodulator 20 also receives a 100 kHz demodulation carrier wave generated by an oscillator 25 phase-locked to the 100-kHz modulation pilot wave in the transmitted signal. The demodulator 20 replaces the received signals into the 0–36 kHz base band.

The self-adapting equalizer 21 receives the symbols which come from the demodulator 20 and removes therefrom the interference due to their passage through the transmission channel. It requires an error signal to be applied to an input 27, said signal being used to self-adapt it by means of internal servo-control units. Its structure is of known type. It is, for example, a time domain transversal filter with a unity delay of one baud period (duration of one symbol) and servo-control units which tend to adjust its weighting coefficients so as to minimize the average mean-squared error, i.e. a transversal filter like the one described in the article by R. W Lucky and H. R. Rudin entitled "An Automatic Equalizer for General Purposes" published on pages 2179 to 2208 of the November 1967 issue of the B.S.T.J. (Bell System Technical Journal). The equalizer 21 also receives the clock rate of the 72-kHz symbols from an oscillator 26 which recovers said clock rate from the 64 kHz pilot wave in the transmitted signal.

The main components of the decoder 22 are a decision circuit 28 and a binary coder 29. The decision circuit 28 compares the level of each symbol delivered by the self-adapting equalizer 21 with seven thresholds at levels 0, ±1, ±2, ±3. It then selects the nearest threshold. The binary coder 29 delivers the pair of digits which corresponds to the selected threshold in the seven-level duobinary code used for transmission. It delivers the digits of each pair in a synchronous sequence at a bit frequency of 144 kHz which is supplied to it by a frequency-doubling circuit 30 from the frequency of the 72-kHz symbols recovered by the oscillator 26.

The unscrambler 23 deduces the synchronous binary data coming from input 14 of the transmitter portion 1 from the sequence of synchronous binary data generated by the decoder 22. Its structure is matched to that of the transmission scrambler 10. It is, for example, that which is recommended in the appendix of CCITT recommendation V 37 and can be deduced from the diagram of FIG. 2, moving strap 106 to make it connect input 107 of shift register 101 to the input of the "EXCLUSIVE NOR" logic gate 105 and not, as allustrated, to the output 109 thereof.

The receiver portion 2 (FIG. 1) also includes a pseudo-random level-generator 31, a subtractor 32, a controlled switch 33 and a circuit 34 for detecting the arrival of a training sequence in the received signal, which sequence allows the equalizer 21 to be supplied with a start signal necessary for it to adapt itself.

The pseudo-random level-generator 31 has a scrambler which is identical to the scrambler 10 of the transmitter portion and whose data input is constantly held at the logic 1 state, while its clock input receives the bit sequence delivered by the frequency-doubling circuit 30. It also has logic circuits for resetting the stages of its shift register to zero and for setting the stages of its counter to one. Scrambling can also be produced by a set of switches from the unscrambler of the receiver portion. The pseudo-random level-generator 31 also has a seven-level duobinary coder which is connected following the scrambler and which performs the same coding as the coder 11 of the transmitter portion except for shaping, which is pointless at this stage, i.e. the duobinary coder delivers only levels 0, +1, −1, +2 −2 and +3 −3 and not symbols in the form $$\frac{\sin(\omega_1 t)}{\omega_1 t}$$

whose relative amplitudes are 0, +1, −1, +2, −2, +3, −3.

The output of the subtractor 32 is connected to the error signal input 27 of the self-adapting equalizer 21. The subtractor has a first input connected to the output of the equalizer and a second input connected via the controlled changeover switch 33 either to the output of the pseudo-random level-generator 31 or to the output of the decision circuit 28 of the decoder 22.

The training sequence detection circuit 34 controls the controlled changeover switch 33, the pseudo-random level-generator 31 and the self-adapting equalizer 21. So long as a training sequence coming from the transmitter portion does not appear at the output of the self-adapting equalizer, the circuit 34 controls the pseudo-random level-generator 31, resets the stages of its shift register to zero and sets the stages of its counter to one; it also positions the controlled changeover switch 33 so as to connect the input of the subtractor 32 to the output of the decision circuit 28 and it indicates to the self-adapting equalizer 21 that servo-control is being performed on data, this indication being used in the equalizer to limit the speed of servo-control thereby ensuring convergence. While a training sequence from the transmitter portion 1 is appearing at the output of the self-adapting equalizer 21, the circuit 34 ceases resetting the shift register to zero and setting the stages of the counter to one in the pseudo-random level-generator 31, thereby allowing it to continue its sequence. At the same time the circuit 34 moves the controlled changeover switch 33 so as to connect the input of the subtractor 32 to the output of the pseudo-random level-generator 31. The appearance of the training sequence is not detected at the output of the self-adapting equalizer 21, but at the input thereof, with the detection circuit 34 then taking into account the time taken by signals to reach the output of the self-adapting equalizer 21 due to the processing time thereof. This detection takes place in the presence of the carrier wave pilot at the frequency of 100 kHz as detected by the oscillator 25 and in accordance with the method of the invention.

Figure 3:
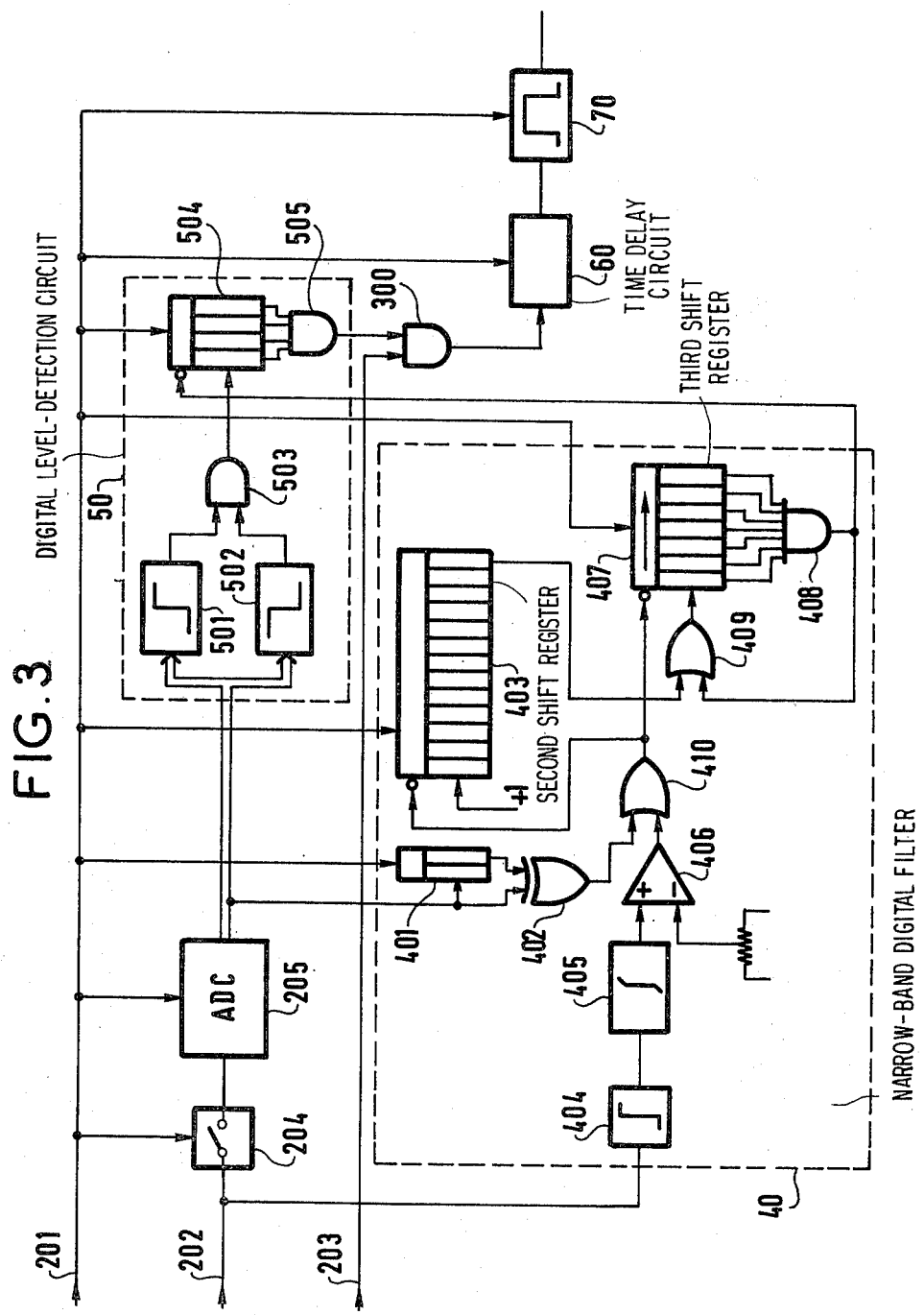
FIG. 3 is a diagram of a circuit for detecting the training sequence, which circuit can be used with the transmission system illustrated in FIG. 1.

FIG. 3 illustrates a digital embodiment of the circuit 34 for detecting a training sequence, showing in detail more particularly the parts by which the method of the invention is put into effect. This circuit 34 has three signal inputs: a first input 201 to which the sequence of symbols (recovered by the oscillator 26 in FIG. 1) is applied; a second input 202 to which the demodulated received signal prior to equalisation is applied (available at the output of the demodulator 20 in FIG. 1); and a third input 203 on which a logic signal is applied which indicates that the oscillator (25, FIG. 1) which generates the demodulation carrier wave during receiving is receiving the modulation carrier wave. The demodulated, but not equalized, received signal is converted into digital samples at the frequency of the symbols by a blocking sampler unit 204 followed by an analog-to-digital converter 205 neither of which forms a part of the training sequence detection circuit per se, but which are in actual fact disposed upstream of the self-adapting equalizer (21, FIG. 1) which is embodied in digital form. The training sequence detection circuit 34 includes a narrow-band digital filter 40 centred on the 18 kHz frequency. It receives a first signal constituted by the received but not equalized symbols which are available at the input 202 and a second signal taken from the output of the analog-to-digital converter 205. The detection circuit 34 further includes a low-amplitude digital detection circuit 50 for analysing the output signal from the analog-to-digital converter 205 under the control of the digital filter 40, a time delay circuit 60 triggered by the digital level-detection circuit 50 in the event that the carrier wave pilot is received, and a monostable circuit 70 energized by the time delay circuit 60 and maintaining its energized state for a period sufficiently long to allow the equalizer to impart maximum values to its coefficients.

The training sequence detection circuit 34 uses the properties of the transmitted signal during the second part of a synchronization sequence and corresponding to the coding on transmission of a succession of pairs of 1-level bits into a succession of pairs of alternately positive and negative 2 amplitude symbols and during the beginning of a training sequence which corresponds to transmission coding of a succession of 31 0-level bits whose initial pairs are coded into null symbols. This transmitted signal initially corresponds to a pure frequency and then, to a null signal. It is insensitive to inter-symbol interference and hence does not need to be equalized. To detect the beginning of a training sequence, it is necessary to detect the first zero level of at least one symbol's duration in the signal formed by the received but not equalized symbols following the detection of the large-amplitude 18-kHz spectrum line. In fact, because of interference noise, the received signal is not exactly zero but there is a large drop in its absolute amplitude and the signal formed by the received but not equalized symbols is deemed to be of zero level as soon as its amplitude lies between coding levels $+1$ and $-1$. Sampling at the symbol frequency used here is not sufficient to be sure that a zero level sample of the signal formed by the received but not equalized symbols necessarily corresponds to a drop in absolute amplitude of said signal since the sampling instant could occur fall in the neighbourhood of a passage through zero of the 18-kHz synchronization signal which actually corresponds to the large-amplitude spectrum line. To remove this doubt, it is possible to double the sampling frequency and to take into account only the first of two successive samples whose amplitude still lies between the levels $+1$ and $-1$. In the present case, it is not necessary to use this possibility since the training sequence begins by a series of 31 zero bits which are coded in transmission by a sequence of null symbols and it suffices to detect, in the signal formed by received but not equalized symbols, the first two samples, taken at the symbol frequency having amplitudes which lie between coding levels $+1$ and $-1$. These two samples necessarily correspond to one or two null symbols since if they belonged to the 18-kHz synchronization symbols, one of them would have an amplitude higher than the $+1$ coding level or lower than the $-1$ coding level. This detection method gives an inaccuracy of one symbol on the beginning of the training sequence. This is not a disadvantage for self-adapting the coefficients of most of the equalizers. It remains usable with a training sequence which begins only by two consecutive null symbols, i.e. by two consecutive groups of bits coded on transmission into two null symbols. In the present case, it can be used with a training sequence beginning with only four zeros.

The digital filter 40 which detects the 18-kHz spectrum line present in the signal formed by the received but not equalized symbols during the second part of a synchronization sequence, comprises a frequency discriminator which only takes into account the polarity bits of the digital samples delivered by the analog-to-digital converter 205 and a circuit which detects the presence of received non-null symbols, which circuit receives the input signal to the analog-to-digital converter 205.

The frequency discriminator includes a first two-stage shift register 401 whose series data input receives the polarity bit of the samples delivered by the analog-to-digital converter 205 and whose clock input is clocked at the 72-kHz symbol rate applied to the input 201. It further includes a two input "EXCLUSIVE OR" logic gate 402 with one input connected to the series data input of the first shift register 401, and the other input connected to the output of the second stage of said second shift register 401. The "EXCLUSIVE OR" logic gate 402 delivers a logic 1 state when its inputs have the same parity—a case which arises when an 18-kHz signal is present whose 72-kHz samples have their polarities reversed every other time. The filtering properties of such a frequency discriminator are expressed by the probability of having a logic 1 state at the output of the "EXCLUSIVE OR" logic gate 402 as a function of the ratio between the frequency of the input signal and the frequency of the clock signal applied to the shift register. This is a saw-tooth function well-known in the prior art. To study it reference may be made to the article by J. Oswald entitled "Détection numérique par échantillonnage" (Digital detection by sampling) which appeared in the magazine Câbles et Transmission, Vol 21° A, No. 1, 1967, pages 20 to 38. This function shows that the pass-band of the discriminator is fairly wide. To reduce it, a check is kept on the constancy of the logic 1 level at the output of the logic "EXCLUSIVE OR" gate 402 by means of a second shift register 403 which has a complemented input for resetting it to zero. This input is controlled from the output of the "EXCLUSIVE OR" gate 402 via a logic "OR" gate 410. The second shift register 403 has a series data input which receives a constant logic 1 state while its clock input receives the 72-kHz symbol clock rate available on the input 201.

The circuit for detecting the presence of received non-null symbols is composed of a hard limiter 404 which peak-limits the signals formed by the received but not equalized symbols applied to the input 202 to obtain a polarity-only signal, followed by an integrator 405 (e.g. an RC circuit and an adjustable-threshold comparator 406 whose output is connected via the logic "OR" gate 410 at the complemented input for resetting the second shift register 403 to zero. This adjustable-threshold comparator 406 delivers a logic 0 state which resets the stages of the second shift register 403 to zero each time the average of the absolute amplitude of the signal formed by the received but not equalized symbols is lower than its threshold.

The digital filter 40 has at its output a third shift register 407 whose stages have their outputs connected to the inputs of a logic "AND" gate 408 which delivers the output signal of the filter. It has a complemented input for resetting to zero connected in parallel to the same input of the second shift register 403, and a clock input connected in parallel with the clock inputs of the first and second shift registers 401 and 403. Its series data input is connected to the output of the last stage of the second shift register 403 via a logic "OR" gate 409, one of whose inputs is connected to the output of the filter 40 to clamp the output of the filter 40 in the logic state by feed-back as soon as the logic 1 state is reached thereon. This third shift register 407 also contributes to reducing the width of the pass band of the filter 40.

The low-amplitude detection circuit 50 has a simplified decision circuit connected to the output of the analog-to-digital converter 205 and indicating whether the digital samples delivered lie between coding levels +1 and −1. This decision circuit is formed by two digital comparators 501 and 502 both of whose outputs generate a logic 1 when the signal is in said range; i.e. the comparator 501 generates the 1 state when the digital sample which is submitted to it is lower than the +1 coding level and the other comparator 502, when the digital sample which is subjected to it is higher than the −1 coding level. A two input logic "AND" gate 503 is connected to the outputs from the comparators 501 and 502.

The low amplitude level detection circuit 50 also has a four-stage shift register 504 whose series data input is connected to the output of the logic "AND" gate 503; whose clock input receives the symbol 72-kHz rate available on input 201 whose complemented reset to zero input is connected to the output of the filter 40 as constituted by the output of the logic "AND" gate 408; and whose stages have their outputs connected to the inputs of a logic "AND" gate 505 which delivers the output signal of the low amplitude level detection circuit 50. This shift register 504 is inhibited by the filter 40 as long as a large-amplitude 18-kHz spectrum line is not detected. In co-operation with the logic "AND" gate 505, it makes it possible to allow the output of the low amplitude level detection circuit 50 to change to logic 1 state only if four successive samples whose amplitudes lie between coding levels +1 and −1 are applied to it on detection of the large-amplitude 18-kHz spectrum line by the filter 40. The use of four successive samples instead of the two which are theoretically necessary is possible because of the long run of zeros which begins the training sequence and provides very good rejection of noise.

A two-input logic "AND" gate 300 has one input connected to the output of the logic "AND" gate 505 and the other connected to the input 203 to prevent a logic 1 state from being taken into account at the output of the low amplitude level detection circuit 50 when there is no modulation pilot wave.

The time delay circuit 60 is triggered by the appearance of a logic 1 state at the output of the logic "AND" gate 300. It compensates the transit time of the transmitted training sequence through the self-adapting equalizer. As this compensation can also be made by means of the shift register of the receiving pseudo-random sequence-generator 31 (FIG. 1) the compensation affects only a few symbols and could be performed by means of a shift register clocked by the 72-kHz symbol rate.

The monostable circuit 70 is triggered by the appearance of a logic 1 level at the output of the time delay circuit 60 and has a sufficient delay to allow the self-adapting equalizer to self-adjust its coefficients. Since this delay is shorter than the duration of a training sequence, the self-adapting equalizer ends its self-adaptation without the assistance of the receiver pseudo-random sequence-generator 31 (FIG. 1) which relies on error signals tapped at the terminals of the decision circuit 28 (FIG. 1). This allows it to correct a possible shift of its coefficients before actual data transmission.

Without going beyond the scope of the invention, some dispositions can be changed or some means can be replaced by equivalent means. In particular, the training sequence detection apparatus can be disposed downstream from the equalizer providing that value 1 is imparted to the coefficient of its main tap and the value 0 is imparted to its other coefficients during the synchronization sequence.

What is claimed is:

1. A method for detecting a training sequence for initializing a self-adaptive equalizer of a receiver located at one end of a synchronous data transmission system having at the other end a transmitter comprising a coder transforming groups of n consecutive bits into corresponding successive multivalent symbols, where n is an integer not less than unity, a group of n consecutive first logic state bits being transformed into a null symbol having a frequency spectrum null and a sequence of groups of n consecutive second logic state bits in a sequence of symbols having a frequency spectrum substantially constituted by a single large amplitude line, said system being of a type which uses, when setting up a link, an initializing procedure comprising a synchronizing sequence followed by a training sequence, the synchronizing sequence at least ending with a period during which a sequence of groups of n consecutive second logic state bits are transmitted and the training sequence beginning with at least one group of n first logic state bits; wherein the method of detecting the training sequence comprises the steps of:

monitoring the symbols received at said one end but not yet equalized;

detecting in said received symbols the presence of a wave of large amplitude with a frequency spectrum substantially constituted by a single large amplitude line;

detecting the presence of a first drop in absolute amplitude that follows in said received symbols the presence of said wave and lasts for at least one symbol period; and treating said detected drop as constituting said null symbol corresponding to the first group of n first logic state bits at beginning of the training sequence.

2. A method according to claim 1, applied to a synchronous data transmission system which uses a training sequence beginning with at least two successive groups of n first logic state bits coded on transmission by two null symbols, wherein the method consists in monitoring successive symbol frequency samples taken a from the received but not yet equalized symbols at the receiver end; in detecting the presence of the large-amplitude spectrum line therein due to the transmission of a sequence of groups of n second logic state bits; and thereafter in detecting the first of two successive samples which have a large drop in absolute amplitude immediately following the detection of the large-amplitude spectrum line and in treating said detected drop in absolute amplitude as constituting said null symbol corresponding to the first group of n first logic state bits at the beginning of the transmitted training sequence.

3. A method according to claim 2 applied to a synchronous data transmission system which uses a duobinary code transforming each group of two successive bits into a symbol which can assume any one of seven amplitude levels- namely 0, +1, −1, +2, −2, +3, −3; and which makes a group of two successive first logic state bits correspond to a null symbol and which makes a sequence of pairs of second logic state bits correspond to an alternating sequence of symbols of amplitude 2 which are alternately positive and negative and whose frequency spectrum is substantially constituted by a single large-amplitude spectrum line whose frequency is equal to one fourth of the symbol frequency, wherein said method consists in monitoring the successive symbol frequency samples taken from the received but not yet equalized symbols; in detecting the presence of a large-amplitude line at one fourth of the symbol frequency; and thereafter in detecting the first of two successive samples which lie between the +1 and −1 amplitude levels immediately following the detection of the large-amplitude line, and in treating said detected amplitude range as constituting said null symbol corresponding to the first group of two first logic state bits at the beginning of the transmitted training sequence.

4. A method according to claim 3, wherein the large-amplitude line at one fourth of the symbol frequency is detected as soon as the polarity of the succesive symbol frequency samples of the signal constituted by the received but not yet equalized symbols changes every other time during a period of several tens of symbols, and wherein during this same period, the average absolute amplitude of said signal exceeds a predetermined threshold value.

5. In a synchronous data transmission system having at a first end a transmitter comprising a coder transforming groups of n corresponding bits in corresponding successive multivalent symbols where n is an integer not less than unity, a group of n consecutive first logic state bits being transformed into a null symbol with a frequency spectrum null and a sequence of groups of n consecutive second logic state bits in a sequence of symbols having a frequency spectrum substantially constituted by a single large amplitude line, and at a second end a receiver comprising a self-adaptive equalizer, said transmission system being of a type which uses, when setting up a link, an initializing procedure comprising a synchronizing sequence followed by a training sequence, the synchronizing sequence at least ending with a period during which a sequence of groups of n consecutive second logic state bits are transmitted and the training sequence beginning with at least one group of n first logic state bits; a training sequence detector circuit located in the receiver for detecting the beginning of the training sequence for the self-adaptive equalizer, comprising:

narrow-band filtering means having a center frequency at said large amplitude spectrum line, said filtering means having an input receiving the symbols received at said second end but not yet equalized; and low amplitude detector means having an input receiving the symbols received at said second end but not yet equalized, said low amplitude detecting means being enabled by said filtering means and delivering an output signal indicative of periods of low absolute amplitude level that last at least as long as one symbol.

6. A circuit according to claim 5 for a synchronous data transmission system which uses a duo-binary code transforming each group of two successive bits into a symbol which can assume any one of seven amplitude levels: namely 0, +1, −1, +2, −2, +3, −3; and which makes a group of two successive first logic state bits correspond to a null symbol and which makes a sequence of pairs of second logic state bits correspond to an alternating sequence of symbols of amplitude which are alternately positive and negative and whose frequency spectrum is substantially constituted by a single large-amplitude spectrum line whose frequency is equal to one-fourth of the symbol frequency, wherein said narrow-band filter comprises:

digital frequency discriminator formed by a first two-stage shift register whose series data input receives a polarity bit of the samples and whose clock input receives a signal representing the frequency of the samples, an "EXCLUSIVE OR" logic gate with one input connected to said series input and with another input connected to the output of the second stage of the shift register, and a second shift register whose series data input receives a fixed logic 1 state, while its clock input receives the sample frequency and a complemented reset to zero input receives the output signal of the "EXCLUSIVE OR" logic gate; and a threshold circuit for detecting an average absolute amplitude of the signal formed by the received but not yet equalized symbols and resetting to zero said second shift register for as long as said absolute amplitude remains lower than a given threshold, its output being connected to the complemented reset to zero input of said second shift register via an "OR" logic gate.

7. A circuit according to claim 5 for a synchronous data transmission system using a training sequence which has at its beginning at least two successive groups of n first logic state bits coded on transmission by two null symbols and having in its receiver portion a circuit which delivers at the symbol frequency signals formed by the received but not yet equalized symbols, wherein the low amplitude level detection circuit of said circuit comprises:
- comparator means to enable it to isolate samples whose amplitudes lie between two limits one on either side of zero amplitude; and
- selection means enabled by the filter when the latter detects a large-amplitude spectrum line, said selection means being sensitive to the appearance of at least two successive low amplitude level samples, the instant of appearance of the first of the two samples being taken as the instant of the beginning of a training sequence.

8. A circuit according to claim 7 for a synchronous data transmission system which uses a duobinary code transforming each group of two successive bits into a symbol which can assume any one of seven amplitude levels: namely $0, +1, -1, +2, -2, +3, -3$; and which makes a group of two successive first logic state bits correspond to a null symbol and which makes a sequence of pairs of second logic state bits correspond to an alternating sequence of symbols of amplitude 2 which are alternately positive and negative and whose frequency spectrum is substantially constituted by a single large amplitude spectrum line whose frequency is equal to one fourth of the symbol frequency wherein said narrow-band filter comprises:
- comparator means formed by a threshold circuit to enable it to isolate samples whose amplitudes lie between $+1$ and $-1$ and to locate them by delivering a logic 1 state at its output; and
- selection means formed by a shift register which has at least two stages and an "AND" logic gate whose inputs are connected to the outputs of the shift register stages, the shift register also having a series data input connected to the output of the comparator means, a clock input to which is applied the sample frequency and a reset to zero input controlled by the filter ensuring the detection of the large-amplitude line.

* * * * *